UNITED STATES PATENT OFFICE.

JULES MASSIGNON AND ETIENNE WATEL, OF PARIS, FRANCE.

MANUFACTURE OF CHROMATES AND BICHROMATES.

SPECIFICATION forming part of Letters Patent No. 463,841, dated November 24, 1891.

Application filed March 18, 1890. Serial No. 344,404. (No specimens.)

*To all whom it may concern:*

Be it known that we, JULES MASSIGNON and ETIENNE WATEL, both citizens of the French Republic, residing at Paris, France, have invented new and useful Improvements in the Manufacture of Chromates and Bichromates, of which the following is a full, clear, and exact description.

The processes hitherto used present several serious disadvantages which make them very expensive and which have not been remedied by the several methods which have been tried for that purpose.

The principal disadvantages are—

First. The enormous consumption of fuel for the oxidation in the ovens of the mineral mixture of lime and potash or salt of potash, (or soda or soda-salt.) This consumption is so large that it forms about twenty-five to thirty-five per cent. of the cost of production of bichromate of potash.

Second. The very hard labor required to stir by hand the material in the ovens during the process of oxidation.

Third. The very incomplete oxidation of the minerals, so that only two-thirds or three-fourths of the sesquioxide of chrome is transformed into chromic acid.

Fourth. The loss of a part of the alkili, potash, or soda by evaporation by being carried off by the hot gases by combination with other substances, notably with the silicium, or by the formation of silicate of potash or of soda.

Our new process diminishes or does away with these disadvantages for the following reasons: First, the consumption of fuel is reduced in a very considerable degree. The oxidation, instead of being effected during the admission of a large volume of very hot air, is performed slowly at the ordinary temperature. Second, the hand-labor for stirring the matter in the ovens is done away with. Third, all the sesquioxide of chrome of the mineral oxidized. Fourth, the losses of potash or soda heretofore alluded to are avoided. Fifth, our process has, moreover, the advantage that it permits the use of less expensive salts of potash or of soda—as, for instance, the sulphates instead of the potash or caustic soda heretofore used. To obtain these results we proceed as follows: The mineral, finely pulverized, is mixed with chloride of calcium and of lime, or with carbonate of lime, in such a proportion that the whole base coming from the caustic lime or the carbonate of lime shall be a little more than the quantity necessary for the formation of a chromate of lime. Then all the sesquioxide of chrome of the mineral will be transformed into chromic acid by oxidation. The chloride of calcium is used in the proportion of one part to three parts of the lime, (caustic lime or carbonate,) which is a suitable mixture for the composition of the oxichloride of calcium. This mixture is obtained by kneading together the pulverized mineral and a paste formed either of lime and carbonate of lime or of carbonate of lime only, slaked or tempered in a concentrated solution of chloride of calcium. If the mixture is made with carbonate of lime, it will not harden immediately in the air; but if lime and carbonate of lime are used the kneaded mixture will get hard and can be formed in briquets or cakes which will partly dry in the open air. The mixture is then placed in an oven, where it is first moderately heated to accomplish the drying, and then it is exposed to the temperature required for the transformation of the carbonate of lime into caustic lime. By using an oven with an ordinary floor or bottom the mixture will oxidate under the action of the warm-air draft much quicker than in the processes heretofore employed, and consequently a saving of fuel is obtained; but if the material, when baked at the temperature required for the transformation of the carbonate of lime, be taken out of the furnace it will then be sufficient to expose the pieces to the air at the ordinary temperature in order to obtain gradually a complete oxidation of the sesquioxide without any further treatment, as the material is sufficiently porous to admit the air into the interior of the pieces. The period necessary for the transformation of the sesquioxide of chrome into chromic acid combined with the lime will vary with the temperature, the dampness of the air, and the thickness of the pieces. The mixture must contain an excess of lime, which excess must be greater in proportion as the process of oxidation is slower, so as to allow for the carbonization of a part of the lime of the mixture by the carbonic acid of the air. This process consequently enables us to obtain the chromic acid in the shape of chromate of lime, and the mixture will contain the following constituents when the oxidation is accomplished: Chromate of lime and chloride of calcium, carbonate of lime and caustic lime, sesquioxide of iron, and gangue, a part of which is mixed with the lime. The cakes, after being dried, may be advantageously baked in a continuous-burning lime-furnace heated with gas, and which may be either a tap-furnace or a chamber-furnace. The oxidation will commence under the action of the air-current, which is introduced into the lime-furnace for the purpose of cooling the cakes and effecting the combustion of the gas. The cakes should be then taken out of the furnace and exposed under sheds to the air until the completion of the oxidation. This work is regulated in the same manner as the work in a tile and brick manufactory. The mixed and molded matter is dried under sheds near the furnace, then baked in the furnace, and after leaving the furnace piled up under sheds or in air-chambers until the completion of the oxidation. This oxidated mixture can then serve for the manufacture of chromates and bichromates, and also of chromic or chlorochromic acids.

In the manufacture of chromates and bichromates of potash and soda the above-described mixture is washed in warm water, so as to obtain a concentrated solution containing all the chloride of calcium and only a small quantity of chromate of lime, which result is attained through the great difference of solubility of these two materials, (the chromate of lime being about one hundred times less soluble than the chloride of calcium.)

In order to recover or utilize the chromate of lime in this solution, we proceed as follows: The solution is concentrated and can then serve for the preparation of a new mixture. The chromate of lime which it contains will thus be extracted in the following manner: The solution can be used for the manufacture of chromate of lead (chrome yellow) by precipitating the chromate of lime by a lead salt. In this way a solution of chloride of calcium is obtained free of chromate and ready to be used again. At the same time the chrome yellow is obtained in a very economical way instead of by the present methods. When after this washing the mixture is treated by a solution of sulphate or carbonate of potash or soda, it will yield chromate of potash or soda, and if sulphuric acid is also used it will yield bichromate of potash or soda in solution. These solutions are filtered to relieve them of insoluble material and are then concentrated and crystallized for the purpose of extracting the salts which have been formed.

The mixture of dry oxidated matter treated by sulphuric acid or chlorohydric acid will enable us to obtain chlorochromic acid in an economical manner. After a washing relieving the mixture of the chloride of calcium and after drying a treatment with sulphuric acid will yield chromic acid without the use of bichromate of potash and soda. This process allows of a considerable reduction of the price of manufacture of chromates and bichromates corresponding to the different advantages hereinbefore set forth.

Having fully described our invention, what we claim as new, and desire to secure by Letters Patent, is—

1. The herein-described process of treating chrome mineral, which consists in finely pulverizing it, mixing it with carbonate of lime and chloride of calcium, then heating such mixture to cause the carbonate of lime to be converted into caustic lime, and subsequently oxidizing the mineral at a low temperature, substantially as set forth.

2. The herein-described process of making chromate of lead, which consists in pulverizing chrome mineral, mixing it with carbonate of lime and chloride of calcium, heating such mixture to cause the carbonate of lime to be converted into caustic lime, subsequently oxidizing the mineral, then washing out the chloride of calcium, and subsequently washing out the chromate of lime, and finally precipitating this chromate of lime by a lead salt to form chromate of lead, substantially as set forth.

In testimony whereof we have signed this specification in the presence of two subscribing witnesses.

JULES MASSIGNON.
ETIENNE WATEL.

Witnesses:
JOSEPH COURRIER,
R. J. PRESTON.